US007221968B2

(12) United States Patent
Oouchi

(10) Patent No.: US 7,221,968 B2
(45) Date of Patent: May 22, 2007

(54) DEDICATED SHORT-RANGE COMMUNICATION APPARATUS FOR MOTOR VEHICLE

(75) Inventor: Jun Oouchi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 552 days.

(21) Appl. No.: 10/734,166

(22) Filed: Dec. 15, 2003

(65) Prior Publication Data

US 2005/0009589 A1 Jan. 13, 2005

(30) Foreign Application Priority Data

Jul. 7, 2003 (JP) ............................ 2003-193059

(51) Int. Cl.
*H04M 1/00* (2006.01)
*H01Q 1/32* (2006.01)

(52) U.S. Cl. .................. 455/575.9; 343/711; 343/713; 343/714; 343/715

(58) Field of Classification Search ................ 343/711, 343/713, 714, 715; 455/575.9
See application file for complete search history.

(56) References Cited

U.S. PATENT DOCUMENTS

| | | | | |
|---|---|---|---|---|
| 5,909,653 A * | 6/1999 | Imura et al. | ............. | 455/575.7 |
| 6,175,791 B1 * | 1/2001 | Oouchi | ........................ | 701/36 |
| 6,356,207 B1 * | 3/2002 | Oouchi | ........................ | 340/928 |
| 2002/0047810 A1 * | 4/2002 | Chatzipetros et al. | ........ | 343/713 |
| 2002/0135509 A1 * | 9/2002 | Talbot et al. | ............... | 342/127 |

FOREIGN PATENT DOCUMENTS

JP 07-014019 A 1/1995

* cited by examiner

*Primary Examiner*—Edan Orgad
*Assistant Examiner*—Bobbak Safaipour
(74) *Attorney, Agent, or Firm*—Sughrue Mion, PLLC

(57) ABSTRACT

An on-vehicle DSRC apparatus includes a main body (11) a signal processing unit provided in the main body (11), an external storage medium insertion slot (12), an antenna array (22) electrically connected to the signal processing unit to perform intercommunication with on-road equipment, a mounting member for the antenna array (22), and an antenna angle holding means (20) mounted swingably on said mounting member (11). The antenna angle holding means (20) is so designed as to set the predetermined range of angle such that a proper angle for enabling intercommunication between the on-road equipment and the antenna array (22) within the predetermined communication area. The angle of the antenna array is automatically held at a proper value owing to swinging movement of the antenna angle holding means.

8 Claims, 4 Drawing Sheets

DEDICATED SHORT-RANGE COMMUNICATION APPARATUS FOR MOTOR VEHICLE

BACKGROUND OF THE INVENTION

1. Field of the Invention

The present invention generally relates to a dedicated short-range communication apparatus (DSRC apparatus) destined to be mounted on an automobile or motor vehicle (hereinafter also referred to as the on-vehicle DSRC apparatus) which can be employed in an electric toll collection system (also referred to as the ETC system) of an intelligent transport system (also referred to as the ITS system). In particular, the present invention is concerned with an on-vehicle DSRC apparatus which can positively ensure a given or predetermined area for communication by automatically holding an antenna array constantly at a proper angle relative to the horizontal plane notwithstanding the locations of the motor vehicle (such as a windshield, a dashboard or the like) at which the on-vehicle DSRC apparatus is to be installed have different angles relative to the horizontal plane.

2. Description of Related Art

In recent years, in the field of the on-vehicle DSRC apparatus designed for performing transmission/reception of information with equipment installed on a road (hereinafter also referred to as the on-road equipment), there have been reported various proposals concerning a variety of improvements of the on-vehicle DSRC apparatus in an effort to making proper the angle at which the antenna array is positioned or installed.

In the conventional on-vehicle DSRC apparatus known heretofore, the antenna array is adjusted to a preset proper angle by means of a motor driver when the antenna array through which communication is performed is mounted on the motor vehicle on a predetermined location thereof. (For particulars, reference may have to be made to Japanese Patent Application Laid-Open Publication No. 14019/1995 (JP-A-H7-14019)).

As is apparent from the above, the conventional on-vehicle DSRC apparatus suffers a problem that the motor driver is required for adjusting the angle of the antenna array to a proper value when the on-vehicle DSRC apparatus is mounted, which involves high cost.

SUMMARY OF THE INVENTION

In the light of the state of the art described above, it is as an object of the present invention to provide an on-vehicle DSRC apparatus which is provided with an antenna angle holding means swingable relative to a mounting member of an antenna array to thereby hold automatically the angle of the antenna array at a proper angle by changing the angle of the antenna array relative to a mounting face.

In view of the above and other objects which will become apparent as the description proceeds, there is provided according to a general aspect of the present invention an on-vehicle DSRC (Dedicated Short-Range Communication) apparatus which includes a main body of the on-vehicle DSRC apparatus to be mounted on a motor vehicle, a signal processing unit provided in the main body of the on-vehicle DSRC apparatus, an external storage medium insertion slot which is integrally formed in the main body of the on-vehicle DSRC apparatus and into which an external storage medium can removably be inserted, and an antenna array electrically connected to the signal processing unit to perform intercommunication with on-road equipment.

The signal processing unit is so designed as to process signals received through the antenna array and send out a variety of signals to the on-road equipment through transaction of information with the external storage medium inserted in the external storage medium insertion slot.

The on-vehicle DSRC apparatus further includes a mounting member for mounting the antenna array at a predetermined location of the motor vehicle, and an antenna angle holding means mounted swingably on the mounting member for holding the angle of the antenna array relative to the horizontal plane of the motor vehicle within a predetermined range of angle.

The antenna angle holding means is so designed as to set the predetermined range of angle such that a proper angle can be ensured for enabling intercommunication between the on-road equipment and the antenna array within the predetermined communication area.

By virtue of the arrangement described above, the angle of the antenna array relative to the horizontal plane can automatically be held at a proper value.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
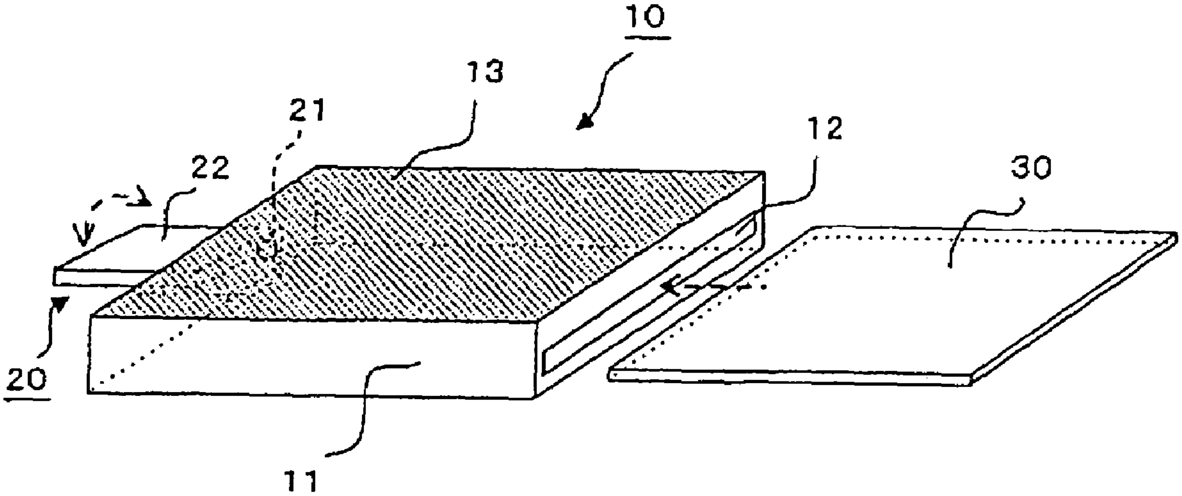
FIG. 1 is a perspective view showing the on-vehicle DSRC apparatus according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Now, referring to FIG. 1, an on-vehicle DSRC (Dedicated Short-Range Communication) apparatus according to a first embodiment of the present invention will be described in detail. FIG. 1 is a perspective view showing the on-vehicle DSRC apparatus according to the first embodiment of the invention. In the on-vehicle DSRC apparatus now under consideration, an antenna array 22 incorporated in a balance member designated generally by reference numeral 20 is provided integrally with a main body 11 of the on-vehicle DSRC apparatus designated generally by reference numeral 10.

Figure 2:
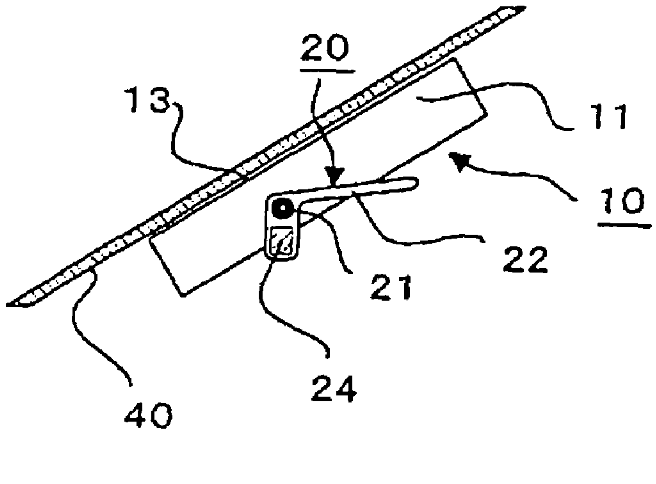
FIG. 2 is a side elevational view for illustrating an example of automatic antenna angle adjusting operation in the on-vehicle DSRC apparatus according to the first embodiment of the invention.
Figure 3:
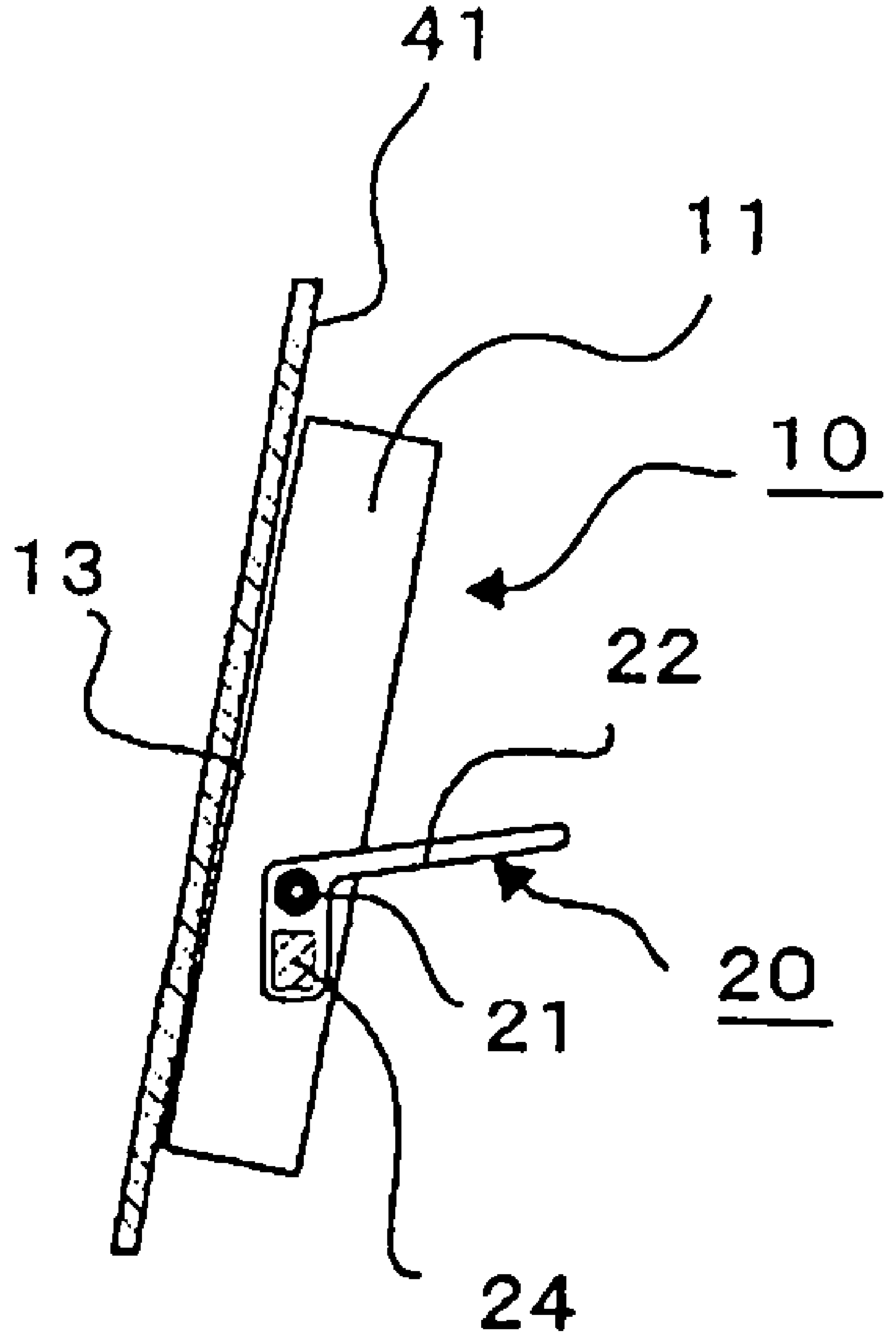
FIG. 3 is a side elevational view for illustrating another example of automatic antenna angle adjusting operation in the on-vehicle DSRC apparatus according to the first embodiment of the invention.

FIGS. 2 and 3 are side views for illustrating automatic angle adjusting operations carried out by an antenna angle holding means in the on-vehicle DSRC apparatus according to the first embodiment of the invention on the presumption that the angles of predetermined locations (windshield surface portions (front glass shield surface portions) 40 and 41 of motor vehicles (not shown) at which the antenna array 22 is to be mounted differ from each other. More specifically, FIG. 2 shows an angle-adjusted state of the antenna array 22 on the windshield surface 40 whose angle relative to the horizontal plane is relatively small (as often seen in sport cars or the like), and FIG. 3 shows the angle-adjusted state of the antenna array 22 on the windshield surface 41 whose angle relative to the horizontal plane is relatively large (as often seen in trucks or the like).

Referring to FIG. 1, a rotatable shaft 21 is mounted on a lateral or side wall of the main body 11 of the on-vehicle DSRC apparatus 10, wherein the balance member 20 is pivotally mounted on the rotatable shaft 21 so as to be swingable in the directions indicated by broken-line arrows. The balance member 20 functions as the antenna angle holding means for automatically adjusting the angle of the antenna array 22, as described later on.

On the other hand, the other side wall of the main body 11 of the on-vehicle DSRC apparatus is integrally formed with an external storage medium insertion slot 12 into which an external storage medium 30 (IC card or the like) can removably be inserted.

Further provided internally of the main body 11 of the on-vehicle DSRC apparatus is a signal processing unit (not shown) which is so designed or programmed as to process signals received through the antenna array 22 and send out from the antenna array 22 a variety of signals to the equipment installed on a road, i.e., on-road equipment (not shown), while transferring information with the external storage medium 30 inserted in the external storage medium insertion slot 12 for processing the information stored in the external storage medium 30.

In this case, the main body 11 of the on-vehicle DSRC apparatus serves as a mounting member for the antenna array 22 incorporated in the balance member 20. To this end, the top surface of the main body 11 of the on-vehicle DSRC apparatus is formed as a mounting face 13 (see hatched portion) adapted for mounting the main body 11 on the windshield surface 40; 41.

Referring to FIGS. 2 and 3, the mounting face 13 of the main body 11 of the on-vehicle DSRC apparatus (i.e., the mounting member for the antenna array 22) is secured onto the windshield surface 40; 41 of the motor vehicle for thereby properly positioning the antenna array 22 on the windshield surface 40; 41.

The balance member 20 is implemented in an L-like shape, as viewed laterally, for the purpose of holding the angle of the antenna array 22 relative to the horizontal plane of the motor vehicle within a predetermined range of angles (proper angle).

The main body 11 of the on-vehicle DSRC apparatus is positioned and attached or secured on an appropriate portion of the windshield surface 40; 41, while the balance member 20 holds a balance relation between the antenna array 22 and the weight 24 so that the antenna array 22 and the weight 24 are properly positioned relative to the windshield surface 40; 41.

More specifically, the balance member 20 mounted pivotally on the rotatable shaft 21 is maintained in the balanced state by the antenna array 22 mounted on the balance member 20 at one end thereof and a weight 24 disposed at the other end. Thus, the balance member 20 is swingable about the rotatable shaft 21.

As can be seen in FIGS. 2 and 3, in the stabilized stationary state of the balance member 20, the angle of the antenna array 22 relative to the horizontal plane is previously so set as to fall within a predetermined range of angle so that a proper angle for ensuring a predetermined area for communication between the on-road equipment and the antenna array 22 can be secured.

The balance member 20 for holding the antenna array 22 at the proper angle is implemented in the structure suited for maintaining constant the area for communication with the on-road equipment by limiting the change of the angle of the antenna array 22 in the state in which the antenna array 22 and the main body 11 of the on-vehicle DSRC apparatus are integrally coupled electrically and mechanically and in which the balance member 20 is mounted on the windshield surface 40; 41 (see FIGS. 1 to 3).

Thus, the angle of the antenna array 22 can change in conformance with the mounting face 13 whose angle differs in dependence on the types of the motor vehicles.

Next, referring to FIGS. 1 to 3, description will be made of operation of the on-vehicle DSRC apparatus according to the first embodiment of the present invention.

At first, operation of the on-vehicle DSRC apparatus 10 will be described in general.

Let's assume that the on-vehicle DSRC apparatus 10 now under consideration is to serve as an on-vehicle ETC (Electronic Toll Collection) apparatus. In that case, the signal processing unit incorporated in the main body 11 of the on-vehicle DSRC apparatus performs radio wave signal transmission/reception with the on-road equipment in the area for communication while executing the signal processing for making the on-vehicle DSRC apparatus 10 function as the ETC.

By inserting the external storage medium 30 into the external storage medium insertion slot 12 as occasion requires, the signal processing unit fetches information (e.g. information intrinsic to the user of the on-vehicle DSRC apparatus 10, etc.) stored previously in the external storage medium 30 to execute a signal processing for preventing the unauthorized use of the on-vehicle apparatus.

The antenna array 22 is electrically connected to the signal processing unit incorporated in the main body 11 of the on-vehicle DSRC apparatus and so designed as to receive a radio wave signal sent from the on-road equipment, which signal is then transferred to the signal processing unit. Further, the antenna array 22 sends to the on-road equipment a response signal which is generated by the signal processing unit incorporated in the main body 11 of the on-vehicle DSRC apparatus in response to the signal received from the on-road equipment in the form of radio wave.

Further, in the case of the on-vehicle ETC apparatus, the signal processing unit is so structurized as to be capable of mutual communication with the external storage medium 30. Thus, the on-vehicle DSRC apparatus 10 serving as the on-vehicle ETC apparatus performs not only the signal transmission/reception with the on-road equipment but also transfer of information concerning the toll transaction or collection on the basis of the signal transferred from the external storage medium 30, to thereby send the required information to the on-road equipment.

Now, description will be directed to the automatic angle adjusting operation of the antenna array 22 in the on-vehicle DSRC apparatus according to the first embodiment of the invention.

It is first to be mentioned that when the on-vehicle DSRC apparatus 10 is mounted on the motor vehicle, the angle of the antenna array 22 remains constant relative to the horizontal plane owing to the swinging movement of the balance member 20 which is provided with the weight 24 in the case where the main body 11 of the on-vehicle DSRC apparatus is mounted on the windshield surface 40 having a small angle of inclination relative to the horizontal plane as shown exemplarily in FIG. 2 as well as in the case where the main body 11 of the on-vehicle DSRC apparatus is mounted on the windshield surface 41 having a large angle of inclination relative to the horizontal plane.

More specifically, when the antenna array 22 is mounted on the windshield surface 40; 41 together with the main body 11 of the on-vehicle DSRC apparatus, the angle of the antenna array 22 automatically changes in conformance with the change of angle of the main body 11 of the on-vehicle DSRC apparatus (windshield surface 40; 41) owing to balancing swing movement of the balance member 20 under gravity of the weight 24. Consequently, the change of angle between the antenna array 22 and the main body 11 of the on-vehicle DSRC apparatus are compensated for such that the angle of the antenna array 22 is automatically regulated or adjusted to the proper angle.

Thus, even in the case where the windshield surfaces 40 and 41 (mounting face 13) present different angles relative to the horizontal plane of the motor vehicle, the angle of the antenna array 22 undergoes substantially no influence. Consequently, the area for communication with the on-road equipment undergoes essentially no deterioration, as a result of which the predetermined area for communication can be ensured.

As is apparent from the above, with the structure of the on-vehicle DSRC apparatus in which the angle of the antenna array 22 is automatically changed by the balance member 20 provided with the weight 24, as described above, the antenna array 22 can be held at the proper angle falling within the predetermined range of angle even in the case where the mounting face 13 of the main body 11 of the on-vehicle DSRC apparatus is mounted on the windshield surfaces 40 and 41 of different angles (see FIGS. 2 and 3).

Thus, the angle of the antenna array 22 is held at the proper angle independently of the mounting angle of the main body 11 (mounting member) of the on-vehicle DSRC apparatus without requiring any adjusting work, and the signal processing unit incorporated in the on-vehicle DSRC apparatus 10 can perform not only the transaction of information with the external storage medium 30 but also transmission/reception of the information concerning the toll collection with the on-road equipment installed on a toll road to thereby make it possible to carry out automatically the toll collection on the basis of the information concerning the toll collection.

Embodiment 2

According to the teaching of the invention incarnated in the first embodiment (FIGS. 2 and 3), the weight 24 is simply mounted on the balance member 20 having the antenna array 22 incorporated therein. A second embodiment of the invention is directed to a structure of the on-vehicle DSRC apparatus in which the weight 24 is made of an electrically conductive material or metal to which a grounding terminal of the antenna array is connected to the weight.

Figure 4:
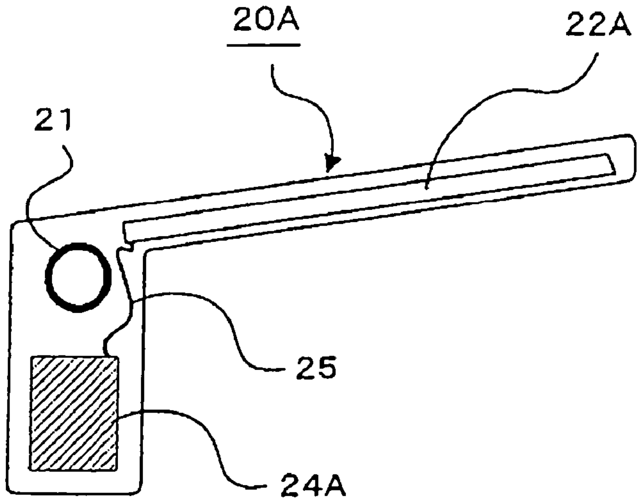
FIG. 4 is a side view showing a balance member employed in the on-vehicle DSRC apparatus according to a second embodiment of the present invention.

FIG. 4 is a side view showing a balance member 20A provided with a metallic weight 24A according to the second embodiment of the present invention. Components same as or equivalent to those described hereinbefore in conjunction with FIG. 1 are denoted by like reference symbols affixed with or without "A", and repeated description described thereof is omitted.

Referring to FIG. 4, the weight 24A is made of a metal having electrical conductivity, wherein a grounding terminal line 25 of the antenna array 22A is connected to the weight 24A.

The mounting structure of the balance member 20 on the windshield surface is similar to what has been described previously. Accordingly, illustration thereof is omitted.

With the structure of the balance member 20A according to the instant embodiment of the invention, the antenna array 22A serves as the grounding terminal of the antenna array 22A as well. Thus, there can be obtained in addition to the advantageous effects mentioned previously the effect that the grounding function of the antenna array 22A can be reinforced.

Embodiment 3

In the on-vehicle DSRC apparatus according to the first embodiment of the present invention described hereinbefore by reference to FIGS. 1 to 3, it is presumed that the apparatus is destined to be mounted exclusively on the windshield surface 40; 41 and thus the rotatable shaft 21 of the balance member 20 is disposed vertically or orthogonally to the side or lateral face of the main body 11 of the on-vehicle DSRC apparatus. By contrast, a third embodiment of the present invention is directed to the on-vehicle DSRC apparatus of such structure in which the rotatable shaft of the balance member is disposed in parallel with the lateral face of the main body of the on-vehicle DSRC apparatus for the purpose of making it possible to mount the on-vehicle DSRC apparatus on a dashboard or the like, by way of example.

Figure 5:
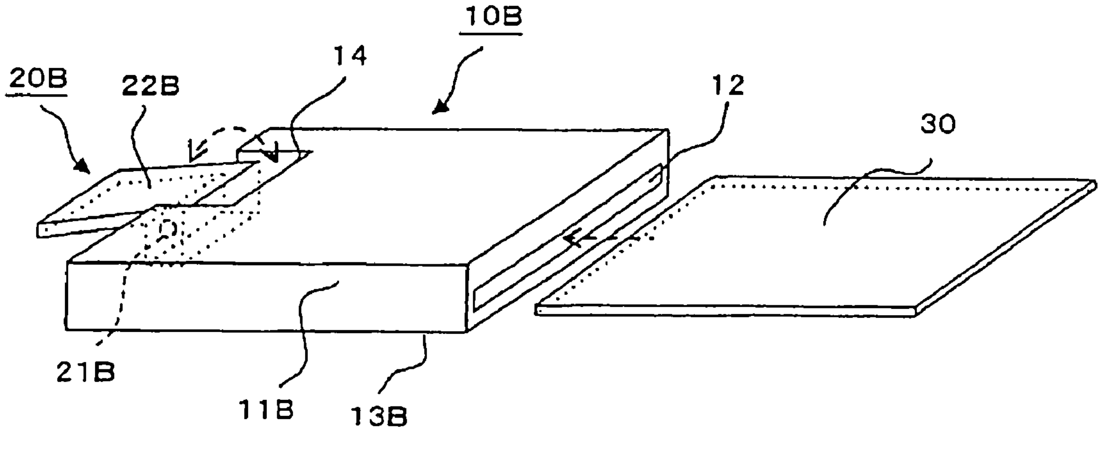
FIG. 5 is a perspective view showing the on-vehicle DSRC apparatus according to a third embodiment of the present invention.

FIG. 5 is a perspective view showing the on-vehicle DSRC apparatus according to the third embodiment of the present invention in which a rotatable shaft 21B of a balance member 20B is disposed in parallel with a lateral face of a main body 11B of the on-vehicle DSRC apparatus. Incidentally, components same as or equivalent to those described hereinbefore in conjunction with FIG. 1 are denoted by like reference symbols affixed with or without "B", and repeated description described thereof is omitted.

Referring to FIG. 5, a notch 14 is formed in a lateral portion of the main body 11B of the on-vehicle DSRC apparatus 10B, and the rotatable shaft 21B of the balance member 20B is disposed in the notch 14. Further, a mounting face 13B for mounting the main body 11B of the on-vehicle DSRC apparatus 10B on a dashboard (not shown) is formed on the bottom surface of the main body 11B of the on-vehicle DSRC apparatus.

In the structure described above, a balance member 20B having an antenna array 22B can reciprocatively rotate or swing around the rotatable shaft 21B in the directions indicated by broken-line arrows. In this conjunction, it should be added that a weight is mounted on the balance member 20B at its other end although illustration thereof is omitted.

With the structure described above, the angle of the antenna array 22B relative to the horizontal plane can automatically be regulated or adjusted so as to be held constant independently of the angle of the mounting face 13B of the main body 11B of the on-vehicle DSRC apparatus.

The on-vehicle DSRC apparatus 10B shown in FIG. 5 has a configuration or form which conforms with the type of e.g. ETC (Electronic Toll Collection) and can be mounted not only on the windshield surface 40; 41 as described previously by reference to FIGS. 2 and 3 but also on the dashboard (not shown).

More specifically, in the case where the main body 11B of the on-vehicle DSRC apparatus is mounted on the dashboard, the angle of the antenna array 22B relative to the horizontal plane of the motor vehicle can always be so automatically adjusted as to assume an proper angle independently of the angle of the dashboard, and thus the area for communication with the on-road equipment can be ensured.

Embodiment 4

In the on-vehicle DSRC apparatus according to the first to third embodiments of the present invention (FIG. 1 to FIG. 5), the antenna array is implemented integrally with the main body of the on-vehicle DSRC apparatus. A fourth embodiment of the present invention is directed to the on-vehicle DSRC apparatus in which the antenna array is disposed separately from the main body of the on-vehicle DSRC apparatus and connected to the signal processing unit by means of a cable.

Figure 6:
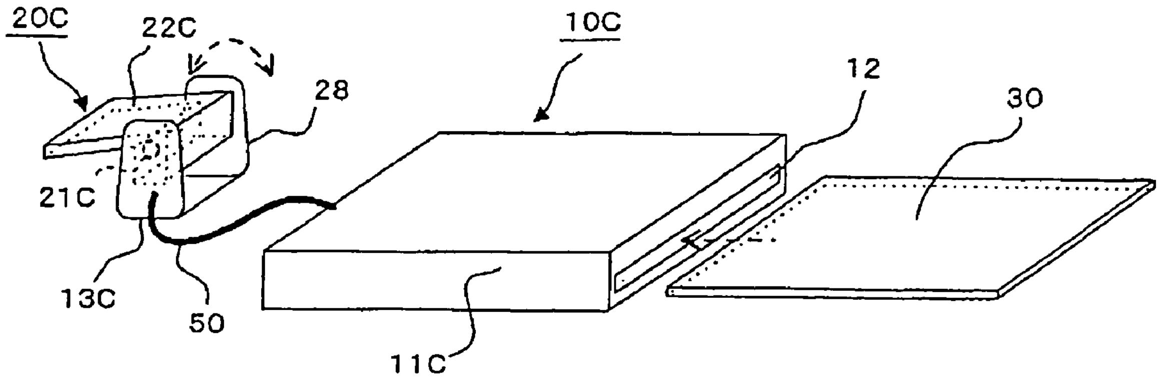
FIG. 6 is a perspective view showing the on-vehicle DSRC apparatus according to a fourth embodiment of the present invention.

FIG. 6 is a perspective view showing the on-vehicle DSRC apparatus according to the fourth embodiment of the present invention in which an antenna array 22C is disposed separately from a main body of the on-vehicle DSRC apparatus. Incidentally, components same as or equivalent to those described hereinbefore in conjunction with FIGS. 1 and 5 are denoted by like reference symbols affixed with or without “C”, and repeated description thereof is omitted.

Referring to FIG. 6, the balance member 20C having the antenna array 22C is disposed separately from the main body 11C of the on-vehicle DSRC apparatus 10C and pivotally mounted on a mounting member 28 provided exclusively for the balance member 20C the medium of a rotatable shaft 21C.

The antenna array 22C on the balance member 20C is electrically connected to the main body 11C of the on-vehicle DSRC apparatus by means of a cable 50.

The main body 11C of the on-vehicle DSRC apparatus is destined to be mounted on a dashboard of a motor vehicle, by way of example. On the other hand, the antenna array 22C provided separately from the main body 11C of the on-vehicle DSRC apparatus is adapted to be mounted on e.g. the dashboard (or alternatively on the windshield surface 40; 41 mentioned previously) by making use of the mounting face 13C of the mounting member 28.

In the on-vehicle DSRC apparatus shown in FIG. 6, the balance member 20C is equipped with a weight similar to the one mentioned previously although not shown so that the antenna array 22C undergoes substantially no influence of the angle of the mounting face 13C of the mounting member 28.

As is apparent from the above, the on-vehicle DSRC apparatus according to the instant embodiment of the invention, the mounting member 28 can be mounted not only on the windshield surface 40; 41 but also on the dashboard while ensuring the advantageous effects mentioned previously.

In other words, owing to the swinging movement of the balance member 20C, the angle of the antenna array 22C is automatically adjusted to a constant proper angle, whereby the area for communication with the on-road equipment can be ensured.

Further, the mounting member 28 of the antenna array 22C provided separately from the main body 14C of the on-vehicle DSRC apparatus can be attached or installed on a given location (e.g. windshield surface 40; 41) which is suited for the communication with the on-road equipment.

Embodiment 5

A fifth embodiment of the present invention is concerned with a rotation angle limiting mechanism 21D for limiting the range of rotation of the balance member on the rotatable shaft.

Figure 7:
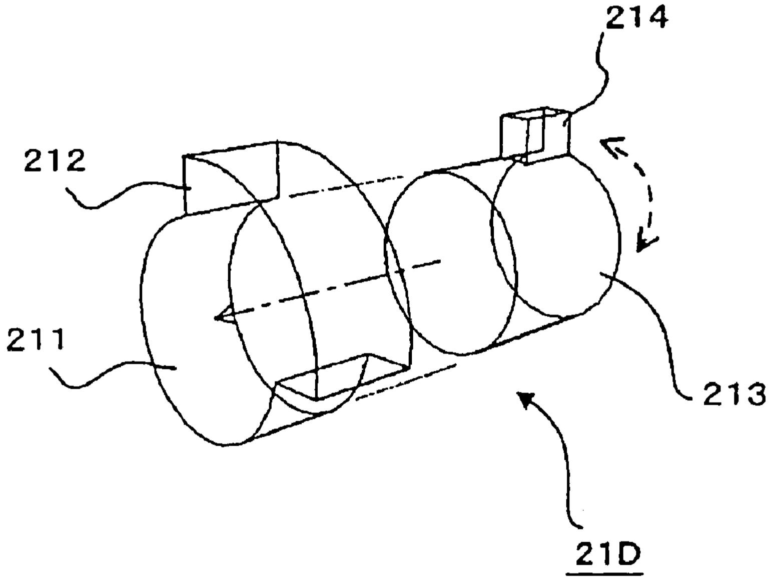
FIG. 7 is an exploded perspective view showing schematically a rotatable shaft employed in the on-vehicle DSRC apparatus according to a fifth embodiment of the present invention.

FIG. 7 is an exploded perspective view showing schematically a rotatable shaft employed in the on-vehicle DSRC apparatus according to the fifth embodiment of the invention, which shaft is provided with a rotation angle limiting mechanism 21D.

Referring to FIG. 7, the rotation angle limiting mechanism 21D is provided at a portion of the rotatable shaft and comprised of a jointing hole 211 formed in the mounting member (secured) and a jointing shaft 213 inserted in the jointing hole 211 rotatably in the directions indicated by broken-line arrows. The balance member (not shown) is provided in combination with the jointing shaft 213.

The jointing hole 211 includes a flange-like concave portion 212. On the other hand, the jointing shaft 213 includes a projecting portion or protrusion 214 which is adapted to engage with the flange-like concave portion 212.

As is apparent from the above, the range of rotation of the jointing shaft 213 is delimited to a range, for example, on the order of 120 degrees, as shown in the figure, because the jointing shaft 213 collides with both lateral faces of the flange-like concave portion 212.

In the on-vehicle DSRC apparatus according to the first to fourth embodiments of the invention described hereinbefore, it is necessary to provide the cable 50 (see FIG. 6), a coaxial line (not shown) or the like in order to electrically couple the antenna array and the on-vehicle DSRC apparatus to each other. In this connection, it is noted that when the antenna array rotates unlimitedly, there may arise such unwanted situation that a load is applied to the coaxial line or the like, incurring degradation in the electric characteristics, because the cable 50 or the coaxial line is twisted excessively.

However, by providing the rotation angle limiting mechanism 21D composed of the jointing hole 211 and the jointing shaft 213 adapted to be received in the jointing hole 211 in combination with the rotatable shaft (member for coupling the antenna array and the main body of the on-vehicle DSRC apparatus), as described above, the coaxial line or the like used for electrically interconnecting the antenna array and the main body of the on-vehicle DSRC apparatus can be prevented from being twisted excessively, because the rotation of the rotatable shaft is limited through cooperation of the flange-like concave portion 212 and the protrusion 214.

Many features and advantages of the present invention are apparent from the detailed description and thus it is intended by the appended claims to cover all such features and advantages of the apparatus which fall within the spirit and scope of the invention. Further, since numerous modifications and changes will readily occur to those skilled in the art, it is not desired to limit the invention to the exact construction and operation illustrated and described.

By way of example, in the description of the on-vehicle DSRC apparatuses according to the first to fourth embodiments of the invention, it has been presumed that the antenna array is destined to be mounted on the windshield 40; 41 or dashboard of the motor vehicle. However, the present invention is never restricted thereto. The antenna array may of course be mounted on other suitable locations. For example, the antenna array may be installed outside of the motor vehicle.

Accordingly, all suitable modifications and equivalents may be resorted to, falling within the scope of the invention.

What is claimed is:

1. An on-vehicle DSRC apparatus including a main body of the on-vehicle DSRC apparatus to be mounted on a motor vehicle;

a signal processing unit provided in said main body of said on-vehicle DSRC apparatus;

an external storage medium insertion slot which is integrally formed in said main body of said on-vehicle DSRC apparatus and into which an external storage medium can removably be inserted; and an antenna array electrically connected to said signal processing unit to perform intercommunication with on-road equipment, wherein said signal processing unit is designed to process signals received through said antenna array and send out a variety of signals to said on-road equipment through transaction of information with said external storage medium inserted in said external storage medium insertion slot, said on-vehicle DSRC apparatus further comprising:

a mounting member for mounting said antenna array at a predetermined location of said motor vehicle; and antenna angle holding means mounted swingably on said mounting member for holding the angle of said antenna array relative to the horizontal plane of said motor vehicle within a predetermined range of angle, wherein said antenna angle holding means is designed to set said predetermined range of angle such that a proper angle can be ensured for enabling intercommunication between said on-road equipment and said antenna array within said predetermined communication area.

2. An on-vehicle DSRC apparatus according to claim 1, wherein said antenna angle holding means is constituted by a balance member pivotally mounted on said mounting member, and wherein the angle of said antenna array relative to a mounting face of said mounting member is held within a constant range of angle associated with said predetermined range of angle.

3. An on-vehicle DSRC apparatus according to claim 2, wherein said balance member has a weight attached at least one location of said balance member.

4. An on-vehicle DSRC apparatus according to claim 3, wherein said weight is made of a metal having electrical conductivity and connected to a grounding terminal of said antenna array.

5. An on-vehicle DSRC apparatus according to claim 2, further comprising:

a rotation angle limiting mechanism for limiting a rotation angle range of said balance member relative to said mounting member.

6. An on-vehicle DSRC apparatus according to claim 1, wherein said mounting member is constituted by said main body of said on-vehicle DSRC apparatus.

7. An on-vehicle DSRC apparatus according to claim 1, wherein said mounting member is disposed separately from said main body of said on-vehicle DSRC apparatus, and wherein said antenna array is electrically connected to said signal processing unit by way of a cable.

8. An on-vehicle DSRC apparatus according to claim 1, wherein said mounting member is mounted on a windshield surface or alternatively on a dashboard of said motor vehicle.

* * * * *